No. 672,620. Patented Apr. 23, 1901.
J. P. HORTON.
VEHICLE STEERING MECHANISM.
(Application filed June 30, 1900.)
(No Model.) 2 Sheets—Sheet 1.

WITNESSES: INVENTOR.
J. P. Horton.
BY
ATTORNEY

No. 672,620. Patented Apr. 23, 1901.
J. P. HORTON.
VEHICLE STEERING MECHANISM.
(Application filed June 30, 1900.)
(No Model.) 2 Sheets—Sheet 2.

WITNESSES:
INVENTOR.
J. P. Horton.
BY
ATTORNEY.

UNITED STATES PATENT OFFICE.

JAMES P. HORTON, OF DENVER, COLORADO.

VEHICLE STEERING MECHANISM.

SPECIFICATION forming part of Letters Patent No. 672,620, dated April 23, 1901.

Application filed June 30, 1900. Serial No. 22,156. (No model.)

*To all whom it may concern:*

Be it known that I, JAMES P. HORTON, a citizen of the United States of America, residing at Denver, in the county of Arapahoe and State of Colorado, have invented certain new and useful Improvements in Vehicles and Steering Mechanism; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in vehicles and steering mechanism; and it consists of the features, arrangements, and combinations hereinafter described and claimed, all of which will be fully understood by reference to the accompanying drawings, in which is illustrated an embodiment thereof.

Figure 1:
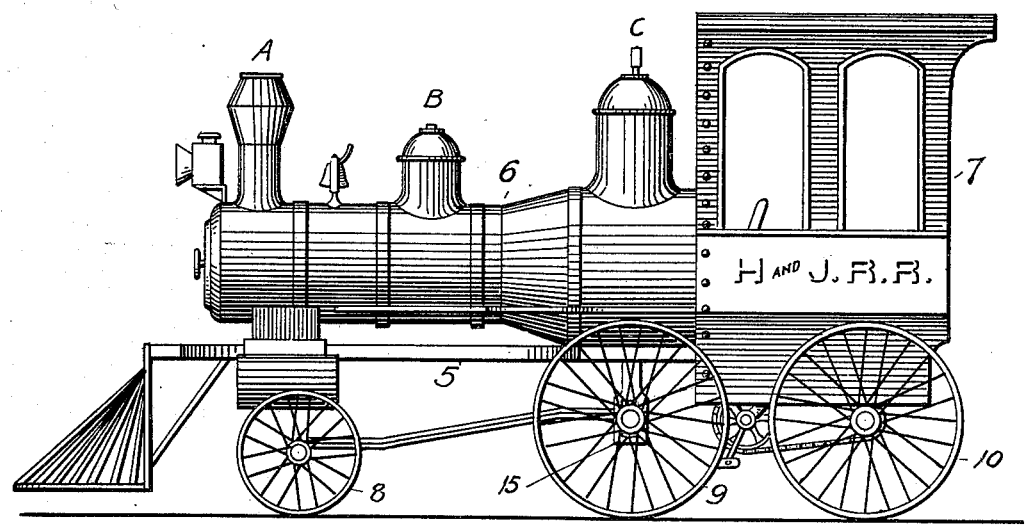
Figure 2:
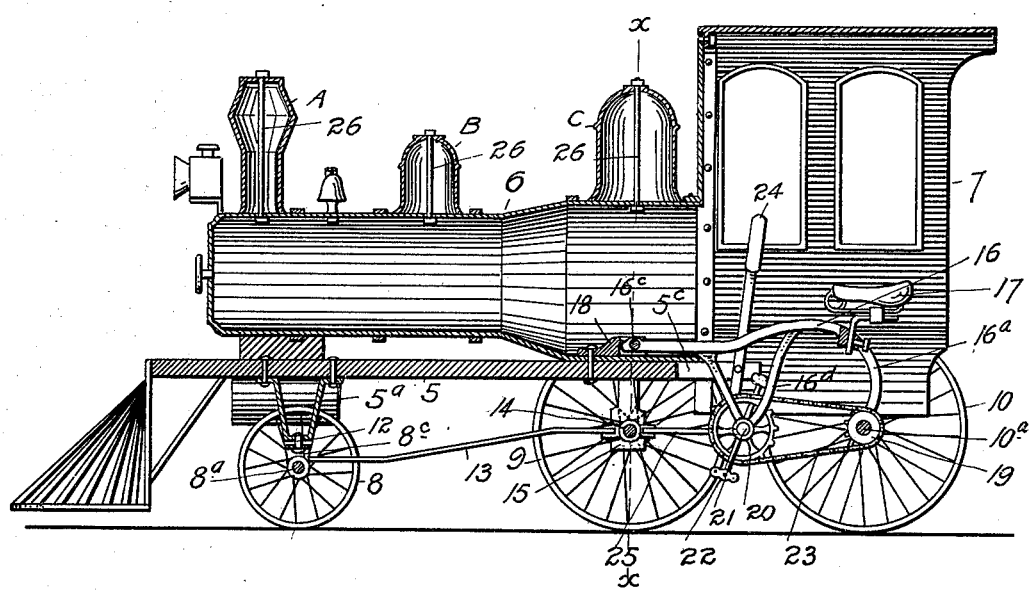
Figure 3:
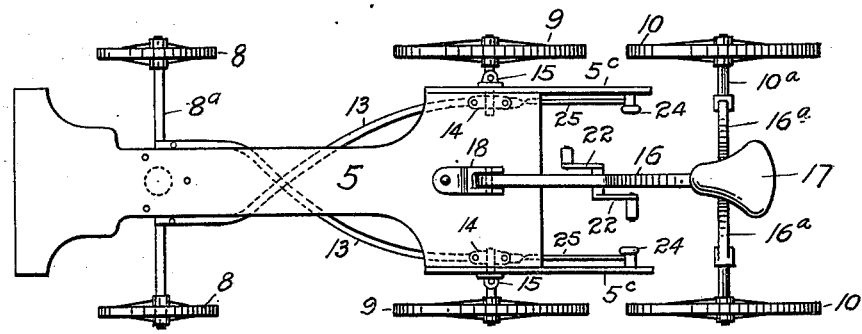
Figure 4:
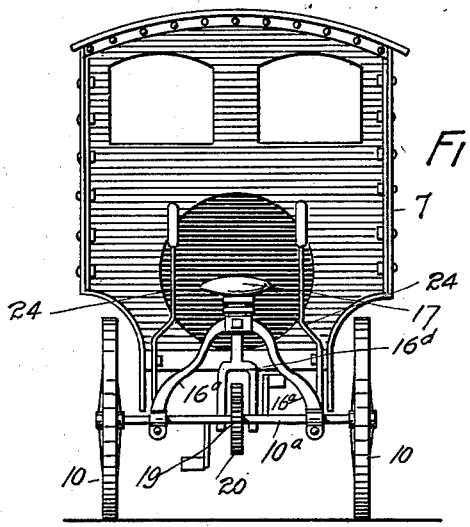
Figure 5:
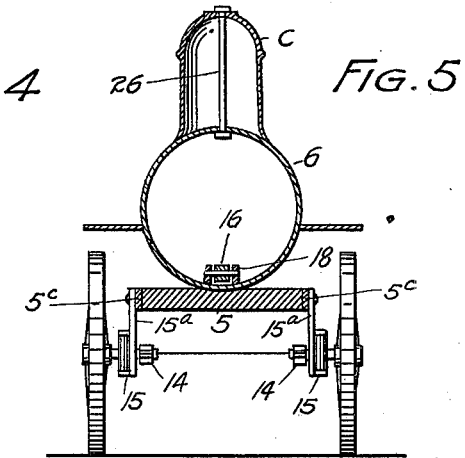
Figure 6:
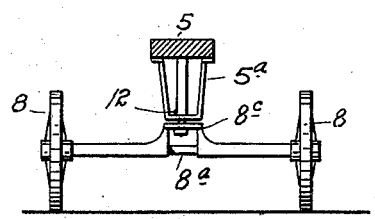
Figures 7, 8:
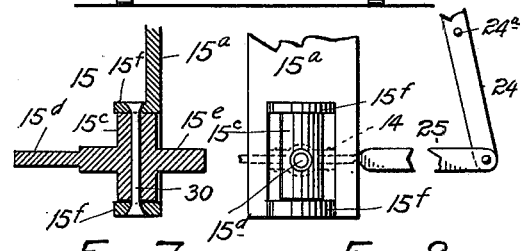

In the drawings, Figure 1 is a side elevation of a toy locomotive equipped with my improvements. Fig. 2 is a vertical longitudinal section of the same. Fig. 3 is a plan view of the running-gear and platform with the body removed. Fig. 4 is a rear end view of the vehicle. Fig. 5 is a section taken on the line X X, Fig. 2. Fig. 6 is a section taken through the platform adjacent the forward wheels, Fig. 7 is a section taken through the journal of one of the intermediate wheels. Fig. 8 is a side view of the same, showing a fragment of the steering-lever and the rod with which it is connected.

The same reference characters indicate the same parts in all the views.

Let the numeral 5 designate the platform upon which is mounted a boiler 6 and cab 7. The boiler is provided with parts A, B, and C, giving the apparatus the general appearance of a steam-operated locomotive. The front part of the platform 5 is supported by a U-shaped bracket $5^a$, whose bottom part is pivotally connected with a plate $8^c$, fast on the front axle $8^a$, by a bolt or pin 12, whereby the axle is allowed to turn freely independently of the platform. The front axle $8^a$ is supported by wheels 8. The rear part of the platform 5 is supported by vertical arms $15^a$, each of which is provided with two vertically-separated lugs $15^f$. Each of the intermediate wheels 10 is mounted on a short or stub axle composed of the wheel-journal $15^d$, a vertical cylinder part $15^c$, and an inward projection $15^e$. The part $15^c$ is provided with a longitudinal opening registering with apertures formed in the lugs $15^f$. Each stub-axle is permitted a horizontal movement on a pin 30, which occupies a position at right angles to the axis of the wheel 9, which engages the journal $15^d$. Each axle projection $15^e$ is provided with a sort of double strap 14, which extends both forward and rearward of the axle. A rod 25 is pivotally connected with this strap in the rear of the axle. The rear extremity of the rod 25 is connected with the lower arm of a lever 24, fulcrumed at $24^c$ on a rearward extension $5^c$ of the platform. Both levers 24 are within easy reach of the rider, who sits on a saddle 17 within the cab. This saddle is mounted on a frame 16, provided with fork-arms $16^a$, in which the axle $10^a$ of the wheels 10 is journaled. The frame 16 is provided with a forwardly-extending bar, which is pivotally connected at $16^c$ with a bracket 18, mounted on the rear part of the platform. The frame 16 is provided with a hanger $16^d$, in which the shaft 21 is journaled. This shaft is provided with pedal-cranks 22 and a sprocket-wheel 20. The sprocket-wheel is connected with a sprocket-wheel 19 on the rear axle $10^a$ by a chain 23.

The rear extremity of each forward rod 13 is pivotally connected with a strap 14 forward of each stub-axle, while the forward extremity of each rod 13 is pivotally connected with the forward axle $8^a$ on the opposite side of the platform or on the opposite side of the pin 12. The two rods 13 cross each other underneath the platform in the rear of the axle $8^a$. (See Fig. 3.)

In operating the vehicle the rider sits on the saddle 17 and propels it by his feet, which are placed on the pedals of the cranks 22. The steering is accomplished through the instrumentality of the levers 24, the two parallel rods 25, and the two crossed rods 13. By virtue of the construction heretofore described it will be understood that the movement of either lever will turn the wheels 8 and 9, causing the machine to turn to the right or left, as may be desired. If the rider desires to turn to the right, he pushes forwardly on the left-hand lever, which draws rearwardly on the left-hand rods 25 and 13, turns the corresponding stub-axle on its vertical axis, and shifts the forward axle $8^a$ to a position parallel with the stub-axle. This movement of the forward axle $8^a$ draws on the opposite rod and imparts a corresponding movement to the right-hand wheel 9 and its stub-axle. If it is desired to turn to the left, the right-hand lever is pushed, with a similar result.

Having thus described my invention, what I claim is—

1. In a vehicle, the combination of three pairs of wheels and axles upon which the wheels are journaled the axles of two pairs of wheels being pivoted on the body of the vehicle, a lever fulcrumed on the body of the vehicle, and a connection between the lever and the axles of two pairs of wheels whereby as the lever is actuated the axles of two pairs of wheels may be shifted to occupy parallel positions and forming an angle with the axle of the third pair of wheels.

2. In a vehicle, the combination with a suitable frame or body, a forward axle centrally pivoted on the body and provided with one pair of wheels, two stub-axles independently pivoted on the body, a wheel journaled on each axle, the axis of each stub-axle pivot extending at right angles to the axis of the wheel on the stub-axle, steering-levers, a rod connecting each lever with a stub-axle, and another rod connecting each stub-axle with the forward axle on the opposite side of the center, the two connecting-rods being crossed between two pairs of wheels.

3. The combination of a vehicle-body and three pairs of wheels, a centrally-pivoted forward axle supported by two wheels, a rear axle supported by two other wheels, two stub-axles supported by the remaining wheels, said stub-axles being pivoted on axes extending at right angles to their supporting-wheels, levers fulcrumed on the body of the vehicle, and suitable means connecting the levers with the stub-axles and the latter with the forward axle whereby the steering is accomplished by the operation of the levers.

In testimony whereof I affix my signature in presence of two witnesses.

JAMES P. HORTON.

Witnesses:
A. J. O'BRIEN,
GRACE MYTINGER.